United States Patent
Effenberger

(10) Patent No.: US 8,050,561 B2
(45) Date of Patent: Nov. 1, 2011

(54) ASYMMETRICAL PON WITH MULTIPLE RETURN CHANNELS

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1158 days.

(21) Appl. No.: 11/677,346

(22) Filed: Feb. 21, 2007

(65) Prior Publication Data
US 2008/0037990 A1 Feb. 14, 2008

Related U.S. Application Data

(60) Provisional application No. 60/822,174, filed on Aug. 11, 2006.

(51) Int. Cl.
*H04J 3/16* (2006.01)
*H04J 14/00* (2006.01)
*H04J 3/26* (2006.01)
*H04L 12/56* (2006.01)
*H04Q 11/00* (2006.01)

(52) U.S. Cl. ........... 398/67; 398/66; 398/69; 398/71; 398/50; 370/270; 370/468; 370/466; 370/252

(58) Field of Classification Search .......... 398/67, 398/66, 68, 77; 455/450–454
See application file for complete search history.

(56) References Cited

U.S. PATENT DOCUMENTS

| | | | | |
|---|---|---|---|---|
| 5,321,541 A * | 6/1994 | Cohen | | 398/82 |
| 7,330,654 B2 * | 2/2008 | Song et al. | | 398/71 |
| 2001/0004290 A1 * | 6/2001 | Lee et al. | | 359/124 |
| 2002/0145775 A1 * | 10/2002 | Effenberger et al. | | 359/123 |
| 2002/0176368 A1 * | 11/2002 | Reddy | | 370/252 |
| 2002/0181047 A1 * | 12/2002 | Lauder et al. | | 359/125 |
| 2004/0208549 A1 * | 10/2004 | Rutledge et al. | | 398/50 |
| 2004/0247316 A1 * | 12/2004 | Soto et al. | | 398/47 |
| 2004/0247320 A1 * | 12/2004 | Bickham et al. | | 398/71 |
| 2005/0129400 A1 * | 6/2005 | Kim et al. | | 398/67 |
| 2005/0213976 A1 * | 9/2005 | Wellen | | 398/71 |
| 2006/0067692 A1 * | 3/2006 | Park et al. | | 398/75 |
| 2006/0115271 A1 * | 6/2006 | Hwang et al. | | 398/72 |
| 2006/0127091 A1 * | 6/2006 | Yoo et al. | | 398/69 |
| 2006/0153565 A1 * | 7/2006 | Park et al. | | 398/71 |
| 2006/0176835 A1 * | 8/2006 | Jang et al. | | 370/270 |
| 2006/0233197 A1 * | 10/2006 | Elmoalem et al. | | 370/468 |
| 2007/0280691 A1 * | 12/2007 | Bouda | | 398/71 |

* cited by examiner

*Primary Examiner* — Shi K Li
*Assistant Examiner* — Oommen Jacob
(74) *Attorney, Agent, or Firm* — Conley Rose, P.C.; Grant Rodolph

(57) ABSTRACT

A passive optical network (PON) system comprising a plurality of optical network units (ONUs) having one downstream receiver and one upstream transmitter, an optical line terminal (OLT) having a downstream transmitter and a plurality of upstream receivers, wherein each upstream receiver is associated with a subset of the ONUs, and an optical distribution network (ODN) that connects the OLT to the ONUs is disclosed. An OLT for a PON, comprising a downstream transmitter, and a plurality of upstream receivers, wherein a downstream transmitter bandwidth is greater than each upstream receiver bandwidth is also disclosed. A network component comprising a processor configured to implement a method comprising determining a downstream bandwidth and an upstream bandwidth for a PON, and increasing a number of upstream channels per downstream channel for the PON when asymmetry between the downstream bandwidth and the upstream bandwidth is greater than a threshold amount is also disclosed.

6 Claims, 4 Drawing Sheets

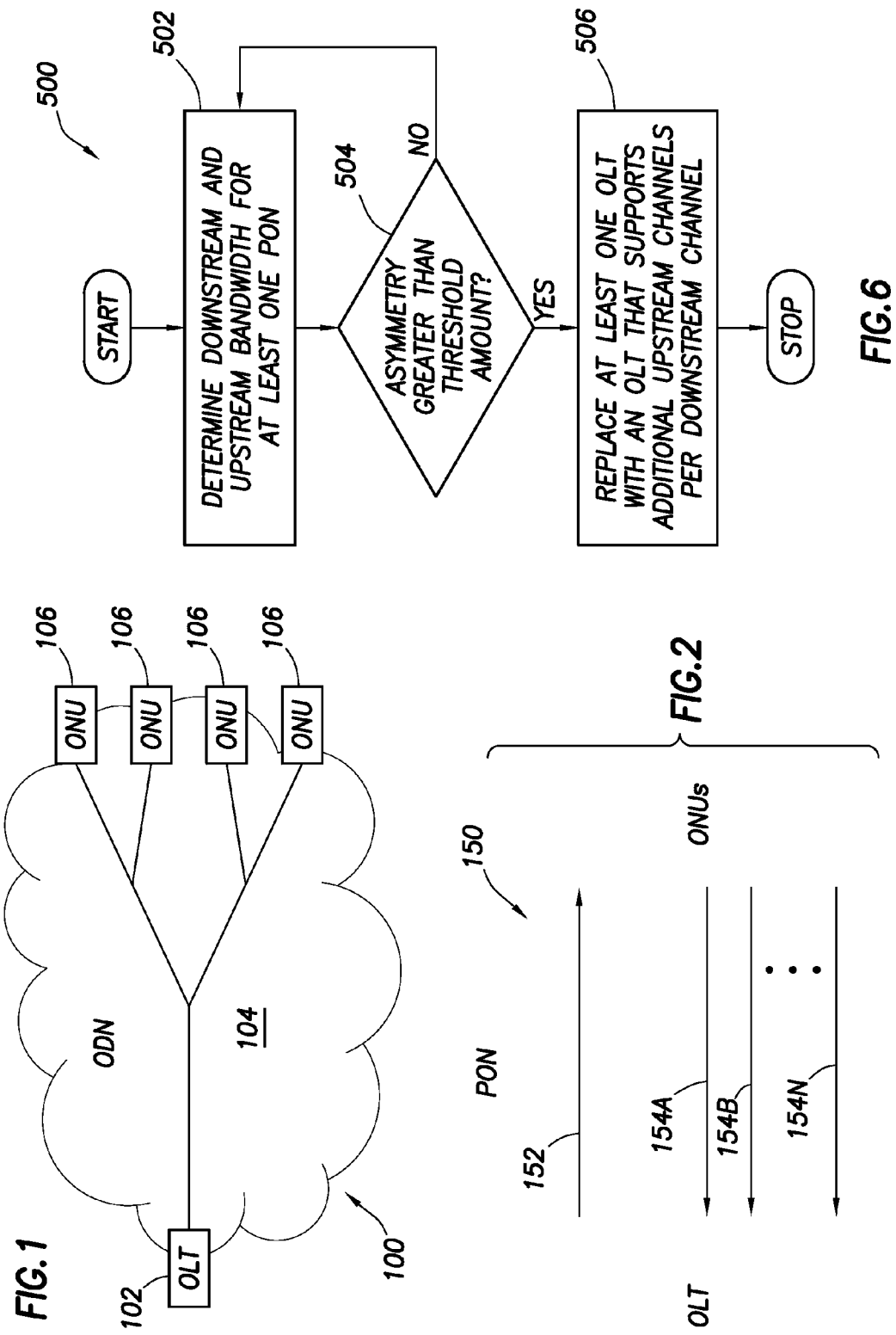

ASYMMETRICAL PON WITH MULTIPLE RETURN CHANNELS

CROSS-REFERENCE TO RELATED APPLICATIONS

This application claims priority to the U.S. Provisional Application Ser. No. 60/822,174, by Frank J. Effenberger, entitled "Asymmetrical PON with Multiple Return Channels," filed on Aug. 11, 2006, which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Several types of optical networks currently exist. Many of these networks are configured with asymmetrical upstream and downstream bandwidth such that the downstream bandwidth is not equal to the upstream bandwidth. More specifically, in many of these networks the downstream bandwidth that extends from the network to the customer is greater than the upstream bandwidth that extends from the customer to the network. For example, a Broadband Passive Optical Network (BPON) system provides 622 Megabits per second (Mbps) of downstream bandwidth and 155 Mbps of upstream bandwidth. Similarly, a Gigabit Passive Optical Network (GPON) system provides 2.4 Gigabits per second (Gbps) of downstream bandwidth and 1.2 Gbps of upstream bandwidth. The asymmetrical bandwidth may be even more pronounced in other networks, such as a Data over Cable Service Interface Specification (DOCSIS) network in which the downstream bandwidth is ten times larger than the upstream bandwidth.

Networks with asymmetrical bandwidths are not always desirable. For example, many interactive services such as voice, video conferencing, file exchange, or gaming are symmetric by nature. The Internet traffic due to peer-to-peer file sharing is also symmetric. Moreover, while some network communications, such as web browsing, may appear to be asymmetrical, the actual machine-to-machine traffic may be less asymmetric due to the network protocol overheads that are exchanged between the machines. Finally, asymmetrical bandwidth may be undesirable because, many network switching and processing devices are designed with symmetric interfaces. For example, a Gigabit Ethernet switch may have a plurality of ports, each of which provides 1 Gbps output and 1 Gbps input. When such switches are employed in a network with asymmetric bandwidth, some of the intrinsic capability of the network switching and processing devices is wasted. Consequently, a need exists for a method for increasing the symmetry of the upstream and downstream bandwidth in a network.

SUMMARY

In one embodiment, the disclosure includes a passive optical network (PON) system comprising a plurality of optical network units (ONUs) having one downstream receiver and one upstream transmitter, an optical line terminal (OLT) having a downstream transmitter and a plurality of upstream receivers, wherein each upstream receiver is associated with a subset of the ONUs, and an optical distribution network (ODN) that connects the OLT to the ONUs.

In another embodiment, the disclosure includes an OLT for a PON, comprising a downstream transmitter, and a plurality of upstream receivers, wherein a downstream transmitter bandwidth is greater than each upstream receiver bandwidth.

In yet another embodiment, the disclosure includes a network component comprising a processor configured to implement a method comprising determining a downstream bandwidth and an upstream bandwidth for a PON, and increasing a number of upstream channels per downstream channel for the PON when asymmetry between the downstream bandwidth and the upstream bandwidth is greater than a threshold amount.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates a PON system in accordance with embodiments of the disclosure.

FIG. 2 illustrates a PON system in accordance with embodiments of the disclosure.

FIG. 6 illustrates another method in accordance with embodiments of the disclosure.

DETAILED DESCRIPTION

Figure 3:
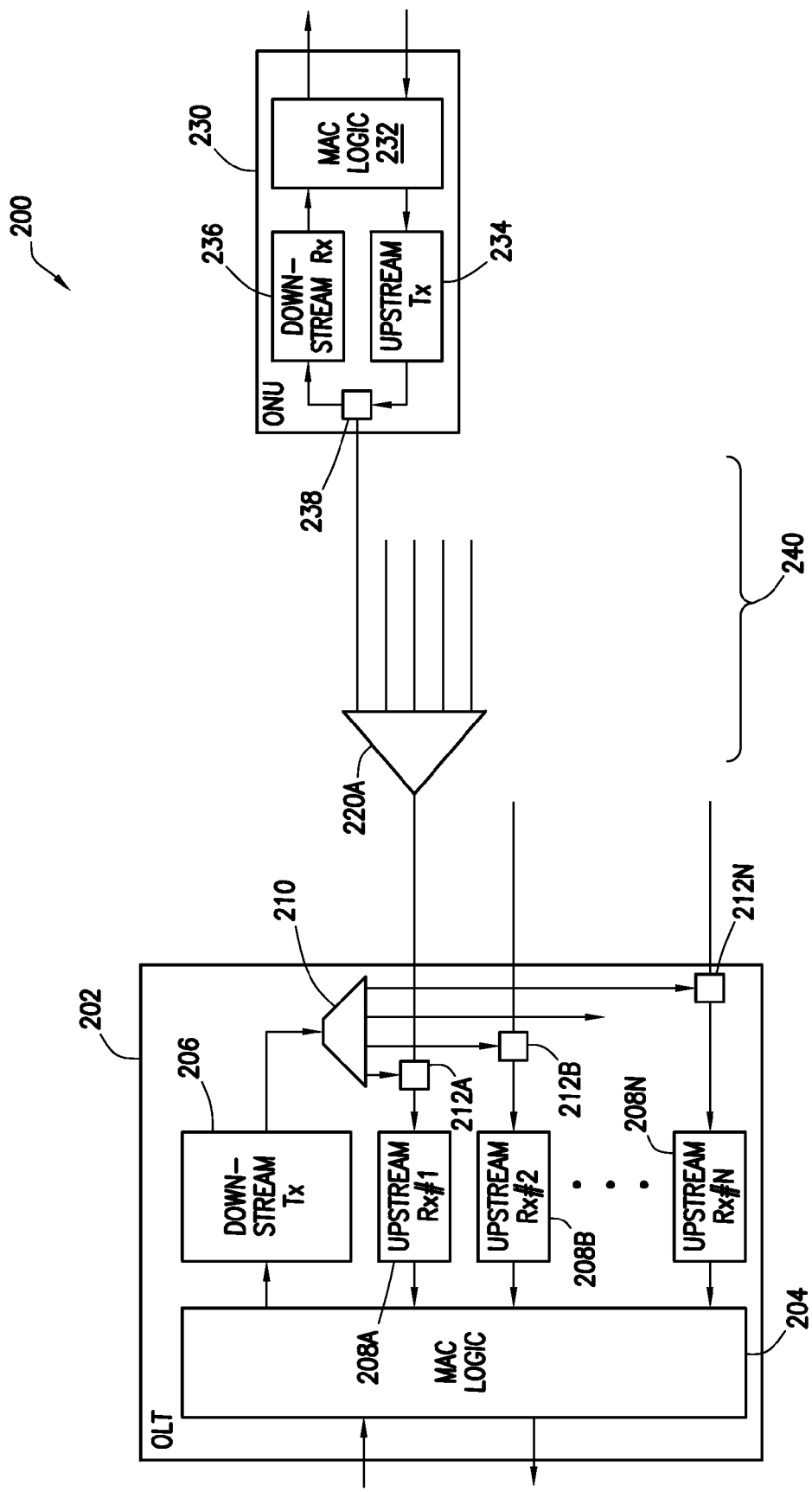
FIG. 3 illustrates a PON system in accordance with embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a passive optical network (PON) configuration containing multiple downstream channels, and methods for reconfiguring asymmetrical optical networks to be more symmetrical. Specifically, the PON may include an optical line terminal (OLT) and a plurality of optical network units (ONUs), where the OLT comprises a plurality of receivers each of which is configured to receive data from a subset of the ONUs. The plural receivers allow the upstream bandwidth capacity to be modified without changing the downstream bandwidth capacity. Such a configuration may allow the number of upstream channels per downstream channel to be modified to improve the bandwidth symmetry in the PON.

FIG. 1 illustrates one embodiment of a PON 100. The PON 100 comprises an OLT 102, an optical distribution network (ODN) 104, and a plurality of ONUs 106. The PON 100 is a communications network that does not require any active components to distribute data between the OLT 102 and the ONUs 106. Instead, the PON 100 uses the passive optical components in the ODN 104 to distribute data between the OLT 102 and the ONUs 106. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 102. The OLT 102 may be any device that is configured to communicate with the ONUs 106 and another network (not shown). Specifically, the OLT 102 may act as an intermediary between the other network and the ONUs 106 in that the OLT 102 forwards data received from the network to the ONUs 106, and forwards data received from the ONUs 106 onto the other network. Although the specific configuration of the OLT 102 may vary depending on the type of PON 100, in an embodiment the OLT 102 comprises a transmitter and a plurality of receivers, as explained in detail below. If the other network is using a protocol, such as Ethernet or SONET/SDH, that is different from the communications protocol used in the PON 100, then the OLT 102 may also comprise a converter that converts the other network's data into the PON's protocol and converts the PON's data into the other network's protocol. The OLT 102 described herein is typically located at a central location, such as a central office, but may be located at other locations as well.

Another component of the PON 100 may be the ONUs 106. The ONUs 106 may be any devices that are configured to communicate with the OLT 102 and a customer or user (not shown). Specifically, the ONUs may act as an intermediary between the OLT 102 and the customer in that the ONUs 106 forward data received from the OLT 102 to the customer, and forward data received from the customer onto the OLT 102. Although the specific configuration of the ONUs 106 may vary depending on the type of PON 100, in an embodiment the ONUs 106 may comprise an optical transmitter configured to send optical signals to the OLT 102, an optical receiver configured to receive optical signals from the OLT 102, and a converter that converts the optical signal into electrical signals for the customer, such as signals in the ATM or Ethernet protocol. The ONUs 106 may also comprise a second transmitter and/or receiver that sends and/or receives the electrical signals to a customer device. In some embodiments, ONUs 106 and optical network terminals (ONTs) are similar, and thus the terms are used interchangeably herein. The ONUs are typically located at distributed locations, such as the customer premises, but may be located at other locations as well.

Another component of the PON 100 may be the ODN 104. The ODN 104 is a data distribution system comprised of optical fiber cables, couplers, splitters, distributors, and/or other equipment known to persons of ordinary skill in the art. In an embodiment, the optical fiber cables, couplers, splitters, distributors, and/or other equipment known to persons of ordinary skill in the art are passive optical components. Specifically, the optical fiber cables, couplers, splitters, distributors, and/or other equipment known to persons of ordinary skill in the art may be components that do not require any power to distribute data signals between the OLT 102 and the ONUs 106. The ODN 104 typically extends from the OLT 102 to the ONUs 106 in a branching configuration as shown in FIG. 1, but may be alternatively configured as determined by a person of ordinary skill in the art.

As shown in FIG. 2, the PON 150 may include a single downstream channel 152 and a plurality of upstream channels 154A-154N between the OLT and the ONUs. The downstream channel 152 may have a higher bandwidth than each of the upstream channels 154A-154N. Accordingly, the number of upstream channels can be selected to improve bandwidth symmetry of the PON 150. In at least some embodiments, each of the upstream channels 154A-154N are associated with a different subset of ONUs. As used herein, the term subset refers to a group of ONUs that is less than all of the ONUs. In embodiments, the upstream channels 154A-154N could represent separate fiber optic cables and/or separate wavelengths for each subset of ONUs.

In at least some embodiments, the number of upstream channels per downstream channel can be selected to achieve a desired bandwidth ratio of downstream bandwidth to upstream bandwidth. For example, if the downstream bandwidth is 10 Gbps per channel and the upstream bandwidth is 1 Gbps per channel, then the bandwidth ratio would be 10:1. If the bandwidth ratio is 10:1, then five upstream channels may be provided between the OLT and the ONUs to achieve a virtual bandwidth ratio of approximately 2:1. In such a configuration, all of the ONUs share the downstream channel while each one of the five ONU subsets is assigned a separate upstream channel. Other bandwidth ratios can alternatively be achieved using the method described herein.

In at least some embodiments, the bandwidth symmetry of the PON 150 can be modified over time. For example, an OLT having one downstream transmitter and one upstream receiver can be replaced by an OLT having one downstream transmitter and a plurality of upstream receivers. Alternatively, an OLT having one downstream transmitter and a plurality of upstream receivers can be replaced by an OLT having one downstream transmitter and additional or fewer upstream receivers. Alternatively, the amount of upstream receivers can be modified without replacing all components of the OLT. For example, the upstream receivers may be part of a modular OLT design that enables upstream receivers to be added or removed as needed. In at least some embodiments, the OLT can be replaced or modified to change the bandwidth symmetry without significantly altering the ONUs or other PON components as will later be described.

FIG. 3 illustrates a PON system 200 in accordance with embodiments of the disclosure. As shown, the system 200 comprises an OLT 202 that couples to a plurality of ONUs 230. In at least some embodiments, each ONU 230 comprises a downstream receiver 236 and an upstream transmitter 234, both of which couple to a diplexer 238. The diplexer 238 separates downstream communications from upstream communications in the ONU 230. Each ONU 230 also comprises Media Access Control (MAC) logic 232 that couples to the downstream receiver 236 and the upstream transmitter 234. The MAC logic 232 enables at least one device, such as a customer computer or multimedia device, to interface with the ONU 230. For example, a computer or multimedia device could couple to the ONU 230 to receive data from the network via the downstream receiver 236 or to transmit data to the network via the upstream transmitter 234.

As shown, the ONUs 230 couple to the OLT 202 via the ODN 240, which comprises optical cables, switches, splitters, and/or other components. The OLT 202 comprises a downstream transmitter 206 and a plurality of upstream receivers 208A-208N. The downstream transmitter 206 and each of the upstream receivers 208A-208N couple to a separate diplexer 212A-212N. Each of the diplexers 212A-212N separates downstream communications from upstream communications. In at least some embodiments, the OLT 202 further comprises a splitter 210 that splits communications from the downstream transmitter 206 to each of the diplexers 212A-212N. Downstream communications are then forwarded to each ONU subset via at least one splitter 220A, which is part of the ODN 240 located between the OLT 202 and each ONU subset. As an example, if there are N ONU subsets in the PON system 200, there could be N diplexers and N upstream receivers in the OLT 202 and N splitters in the ODN 240. In at least some embodiments, each ONU subset couples to the OLT 202 via separate fiber optic cables. Thus, all ONUs 230 can share the same upstream wavelength.

In some embodiments, the transmission power for the downstream transmitter 206 is selected based on the number of ONUs 230 in the PON system 200 and/or the number of ONU subsets. The number of ONU subsets is generally equal to the number of splits in the downstream communication. Accordingly, the downstream transmitter 206 of the OLT 202 may be more powerful than the upstream transmitter 234 of the ONU 230 in order to handle the higher number of splits in downstream communications.

As shown, the OLT 202 further comprises MAC logic 204 that couples to the downstream transmitter 206 and the upstream receivers 208A-208N. The MAC logic 204 enables networked devices to interface with the OLT 202. In this manner, network communications can be forwarded to ONUs 230 via the OLT 202 and the ODN 240. Alternatively, communications from the ONUs 230 can be forwarded to network devices via ODN 240 and the OLT 202.

In at least some embodiments, the OLT 202 can replace an OLT having one downstream transmitter and one upstream receiver. Alternatively, the OLT 202 can replace an OLT having one downstream transmitter and additional or fewer upstream receivers. In some embodiments, the number of upstream receivers 208A-208N can be modified without replacing all components of the OLT 202. In some cases, the splitter 210 may need to provide additional outputs or an additional diplexer may be needed. Additional upstream receivers, additional splitter outputs and/or additional diplexers could be added as needed or could be built into the OLT 202 and operate as needed. If needed, components could be added to or removed from the ODN 240 as well.

Figure 4:
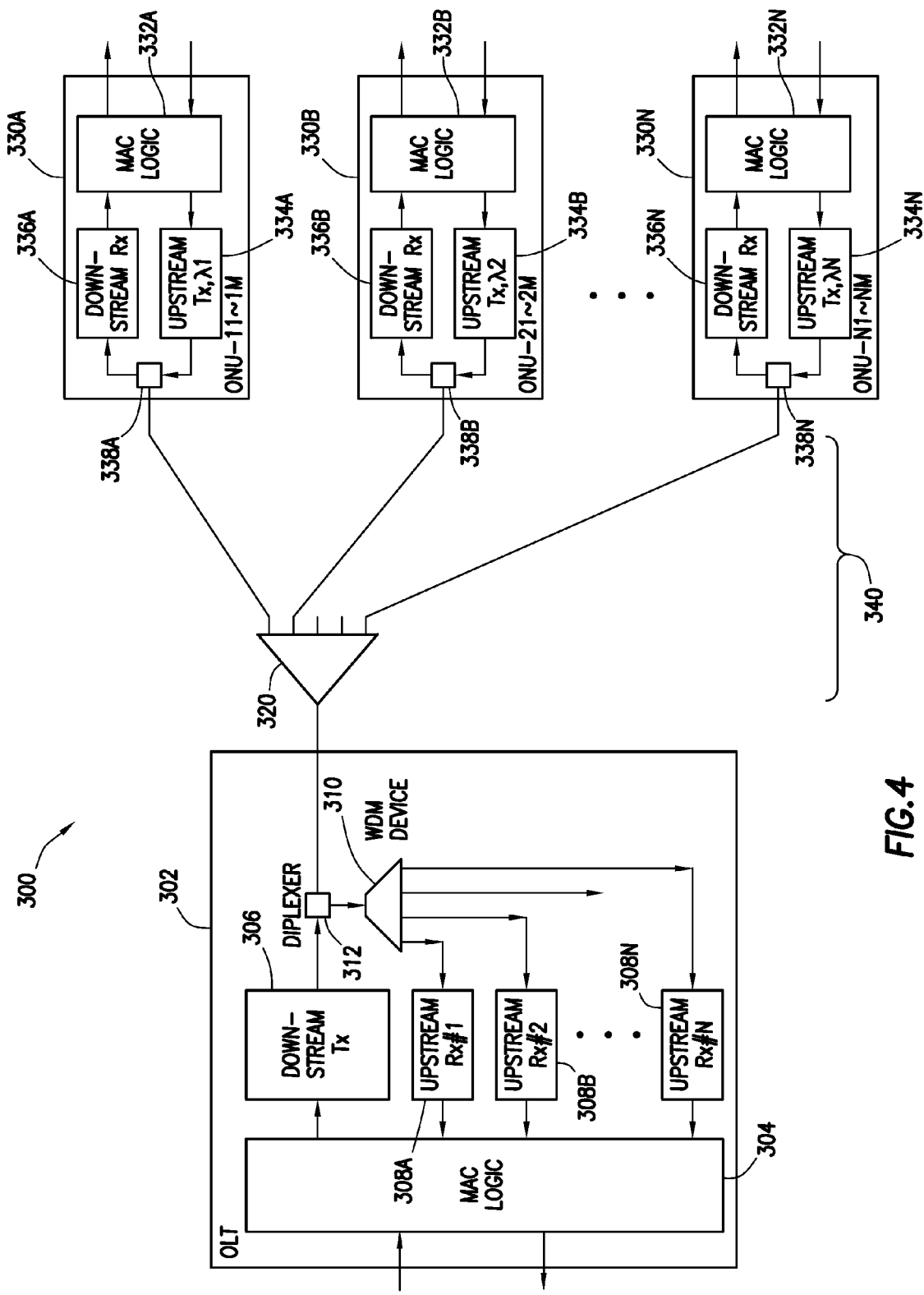
FIG. 4 illustrates another PON system in accordance with embodiments of the disclosure.

FIG. 4 illustrates another PON system 300 in accordance with embodiments of the disclosure. As shown, the system 300 comprises an OLT 302 that couples to a plurality of ONUs 330A-330N. Each of the ONUs 330A-330N is part of an ONU subset. The ONUs 330A-330N may have the same components as the ONU 230 described previously. However, in at least some embodiments, each ONU subset is associated with a different upstream wavelength. As an example, ONU 330A may be associated with upstream wavelength λ1, ONU 330B may be associated with upstream wavelength λ2, and so forth.

As shown, the ONUs 330A-330N couple to the OLT 302 via an ODN 340, which comprises optical cables, switches, splitters and/or other components. The OLT 302 comprises a downstream transmitter 306 and a plurality of upstream receivers 308A-308N. The downstream transmitter 306 and the upstream receivers 308A-308N couple to a diplexer 312, which separates downstream communications from upstream communications. In at least some embodiments, a wavelength division multiplexer (WDM) device 310 is placed between the diplexer 312 and the upstream receivers 308A-308N to selectively forward upstream communications to the appropriate receiver. By associating each upstream channel with a different wavelength, the ONU subsets are able to share at least one fiber optic cable of the ODN 340. In some embodiments, the PON system 300 may implement a single downstream wavelength for all ONUs and a different upstream wavelength for each ONU subset.

In FIG. 4, downstream communications are forwarded to each ONU subset via at least one splitter 320, which is part of the ODN 340 located between the OLT 302 and each ONU subset. As an example, if there are N ONU subsets in the PON system 300, there could be one diplexer and N upstream receivers in the OLT 302, and one splitter 320 in the ODN 340. Additional splitters could be added to the ODN 340 as needed.

In some embodiments, the transmission power for the downstream transmitter 306 is selected based on the number of ONUs 330A-330N in the PON system 300 and/or the number of ONU subsets. Accordingly, the downstream transmitter 306 of the OLT 302 may be more powerful than the upstream transmitter of each ONU in order to handle the higher number of splits in downstream communications.

In at least some embodiments, the OLT 302 can replace an OLT having one downstream transmitter and one upstream receiver. Alternatively, the OLT 302 can replace an OLT having one downstream transmitter and additional or fewer upstream receivers. In some embodiments, the number of upstream receivers 308A-308N can be modified without replacing all components of the OLT 302. In some cases, the WDM device 310 may need to provide additional outputs. Additional upstream receivers and/or additional WDM outputs could be added as needed or could be built into the OLT 302 and operate as needed. If needed, components could be added to or removed from the ODN 340 as well.

Figure 5:
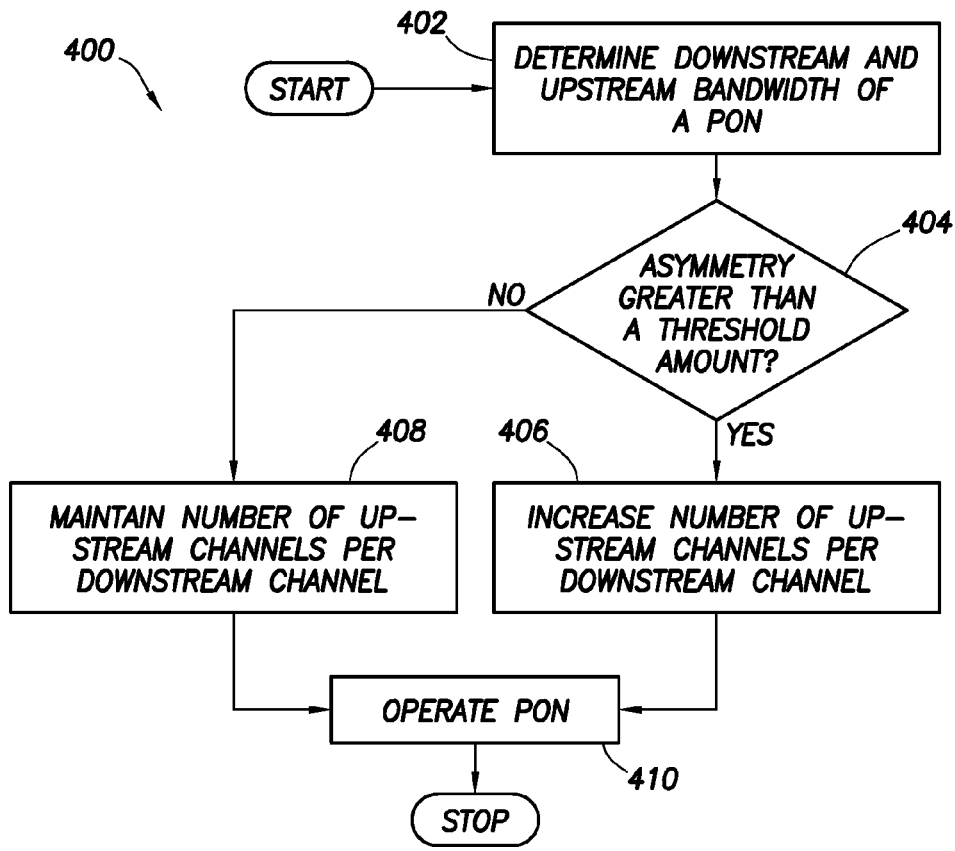
FIG. 5 illustrates a method in accordance with embodiments of the disclosure.

FIG. 5 illustrates a method 400 in accordance with embodiments of the disclosure. As shown, the method 400 comprises determining the downstream and upstream bandwidths of a PON at block 402. If the asymmetry is greater than a threshold amount as determined at block 404, then the number of upstream channels per downstream channel in the PON is increased at block 406. For example, the number of upstream channels can be increased by assigning ONUs of a PON to different subsets, each subset being associated with a separate upstream receiver in an OLT. If the asymmetry is not greater than the threshold amount as determined at block 404, then the number of upstream channels per downstream channel in the PON is maintained at block 408. The PON then operates at block 410, for example by transmitting data between the OLT and the ONUs. The method 400 can be repeated as needed, for example, when the number of upstream channels per downstream channel needs to be increased or decreased.

FIG. 6 illustrates another method 500 in accordance with embodiments of the disclosure. As shown, the method 500 comprises determining the downstream and upstream bandwidth of a PON at block 502. If the asymmetry is greater than a threshold amount as determined at block 504, then at least one OLT is replaced with an OLT that supports additional upstream channels per downstream channel at block 506. In alternative embodiments, an OLT is not replaced but is modified to increase the number of upstream receivers supported by the OLT. For example, the OLT may be modular such that upstream receivers can be added or removed as needed. If the asymmetry is not greater than the threshold amount as determined at block 504, the method 500 returns to block 502.

Embodiments of the disclosure provide cost and performance improvements over a symmetric 10 GB EPON system. Optically, since the downstream and upstream split ratios are unlinked, there is more control over the loss budget. For each doubling of the number of upstream channels, the loss budget of downstream communications can be increased by approximately 3 decibels (dB). The loss budget can be cost effectively implemented using a higher transmitter power for the OLT, for example an erbium-doped fiber amplifier (EDFA), which is then shared over a larger number of customers.

In accordance with embodiments, the control of network communications may follow existing PON MAC techniques without the re-engineering line protocols. For example, the Multi-PON Control Protocol (MPCP) may be used for EPON systems and the Gigabit Transmission Protocol (GTP) may be used to GPON systems. From the point of view of each ONU, there is no awareness of multiple upstream channels. The OLT is responsible for operating the multiple upstream channels and manages the upstream channels as N separate virtual PONs. In some embodiments, the Logical Link Identifiers (LLIDs) or ONU identifiers would be unique for each ONU subset. Also, any protocol messages going downstream on each virtual PON could be multiplexed onto the single downstream. In the case of EPON, Ethernet frame multiplexing could be used to perform this function. In the case of GPON, bandwidth maps for the virtual PONs could be concatenated and Physical Layer Operations, Administrations, and Maintenance (PLOAM) messages could be sent sequentially.

Figure 7:
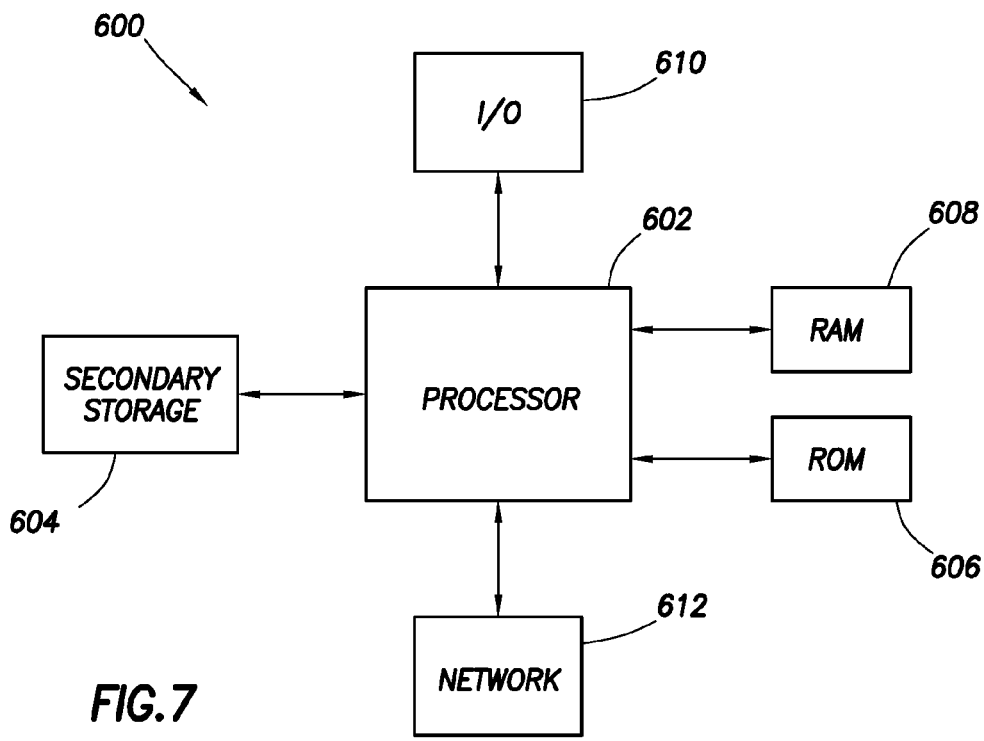
FIG. 7 illustrates an exemplary general-purpose computer system suitable for implementing the several embodiments of the disclosure.

The network described above may be implemented on any general-purpose network component, such as a computer, router, switch, or bridge, with sufficient processing power, memory resources, and network throughput capability to handle the necessary workload placed upon it. FIG. 7 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical line terminal (OLT) for a passive optical network (PON), comprising:
   a downstream transmitter;
   a plurality of upstream receivers, wherein a downstream transmitter bandwidth is greater than each upstream receiver bandwidth, and wherein at least some of the upstream receivers are configured to receive the same upstream wavelength;
   a splitter coupled to the downstream transmitter, wherein the splitter is configured to split a signal from the downstream transmitter based on the number of upstream receivers; and
   a plurality of diplexers each of which is coupled to the splitter and a corresponding one of the upstream receivers, wherein each diplexer is positioned between the splitter and the corresponding one of the upstream receivers.

2. A network component comprising a processor configured to:
   determine a downstream bandwidth and an upstream bandwidth for a passive optical network (PON); and
   increase a number of upstream channels per downstream channel for the PON when asymmetry between the downstream bandwidth and the upstream bandwidth is greater than a threshold amount, wherein at least some of the upstream channels have different upstream optical wavelengths, and
   wherein increasing the number of upstream channels per downstream channel comprises adding additional upstream optical wavelengths without decreasing the downstream bandwidth.

3. The network component of claim 2, wherein increasing a number of upstream channels per downstream channel for the PON comprises replacing a first optical line terminal (OLT) in the PON with a second OLT, the second our having more upstream receivers than the first our.

4. The network component of claim 2, wherein increasing a number of upstream channels per downstream channel for the PON comprises replacing multiple optical line terminals (OLTs) in the PON with an adjustable OLT, the adjustable OLT having a plurality of upstream receivers and a single downstream transmitter.

5. The network component of claim 2 further configured to divide a plurality of optical network units (ONUS) into subsets and assigning each subset to a separate upstream channel.

6. The network component of claim 2, wherein at least some of the upstream channels share a common wavelength.

* * * * *

UNITED STATES PATENT AND TRADEMARK OFFICE
CERTIFICATE OF CORRECTION

| | | |
|---|---|---|
| PATENT NO. | : 8,050,561 B2 | |
| APPLICATION NO. | : 11/677346 | |
| DATED | : November 1, 2011 | |
| INVENTOR(S) | : Frank J. Effenberger | |

It is certified that error appears in the above-identified patent and that said Letters Patent is hereby corrected as shown below:

In column 8, claim 3 should read as follows:
The network component of claim 2, wherein increasing a number of upstream channels per downstream channel for the PON comprises replacing a first optical line terminal (OLT) in the PON with a second OLT, the second OLT having more upstream receivers than the first OLT.

Signed and Sealed this
Twentieth Day of December, 2011

David J. Kappos
*Director of the United States Patent and Trademark Office*

UNITED STATES PATENT AND TRADEMARK OFFICE
CERTIFICATE OF CORRECTION

PATENT NO.         : 8,050,561 B2                                        Page 1 of 1
APPLICATION NO.    : 11/677346
DATED              : November 1, 2011
INVENTOR(S)        : Frank J. Effenberger It is certified that error appears in the above-identified patent and that said Letters Patent is hereby corrected as shown below:

In column 8, lines 45-49, claim 3 should read as follows:
The network component of claim 2, wherein increasing a number of upstream channels per downstream channel for the PON comprises replacing a first optical line terminal (OLT) in the PON with a second OLT, the second OLT having more upstream receivers than the first OLT.

This certificate supersedes the Certificate of Correction issued December 20, 2011.

Signed and Sealed this
Tenth Day of January, 2012

David J. Kappos
*Director of the United States Patent and Trademark Office*